US009756551B2

(12) United States Patent
Daragon et al.

(10) Patent No.: US 9,756,551 B2
(45) Date of Patent: Sep. 5, 2017

(54) METHOD FOR JOINING A CLUSTER OF COMMUNICATING ELECTRONIC DEVICES VIA A WIRELESS NETWORK, ASSOCIATED SYSTEM AND ELECTRONIC DEVICE IMPLEMENTING SAID METHOD

(71) Applicants: TRAXENS, Marseilles (FR); INST NAT DE RECHERCHE EN INFO ET EN AUTOMATIQUE, Rocquencourt (FR)

(72) Inventors: Pascal Daragon, Greasque (FR); Natale Guzzo, Marseilles (FR); Nathalie Mitton, Villeneuve d'Ascq (FR); Arulnambi Nandagoban, Marseilles (FR)

(73) Assignees: TRAXENS, Marseilles (FR); INSTITUT NATIONAL DE RECHERCHE EN INFORMATIQUE ET EN AUTOMATIQUE, Rocquencourt (FR)

( * ) Notice: Subject to any disclaimer, the term of this patent is extended or adjusted under 35 U.S.C. 154(b) by 0 days.

(21) Appl. No.: 15/401,715

(22) Filed: Jan. 9, 2017

(65) Prior Publication Data
US 2017/0127337 A1 May 4, 2017

Related U.S. Application Data

(63) Continuation of application No. PCT/FR2015/051776, filed on Jun. 29, 2015.

(30) Foreign Application Priority Data

Jul. 10, 2014 (FR) ...................................... 14 56660

(51) Int. Cl.
*G06F 15/173* (2006.01)
*H04W 40/32* (2009.01)
(Continued)

(52) U.S. Cl.
CPC ......... *H04W 40/32* (2013.01); *H04L 41/0803* (2013.01); *H04L 67/12* (2013.01); *H04W 4/006* (2013.01)

(58) Field of Classification Search
CPC ..... H04L 47/70; H04L 41/0803; H04L 67/12; H04L 69/24; H04W 40/32
(Continued)

(56) References Cited

U.S. PATENT DOCUMENTS

| 2014/0006502 A1* | 1/2014 | Gandhi ..................... G06F 9/52 709/204 |
| 2014/0025770 A1* | 1/2014 | Warfield ........... G06F 15/17331 709/213 |
| 2016/0219117 A1* | 7/2016 | Marlatt ................. G06F 9/5027 |

OTHER PUBLICATIONS

International Search Report (PCT/ISA/210) issued on Nov. 9, 2015, by the French Patent Office as the International Searching Authority for International Application No. PCT/FR2015/051776.
(Continued)

*Primary Examiner* — Phuoc Nguyen
(74) *Attorney, Agent, or Firm* — Buchanan Ingersoll & Rooney PC (57) ABSTRACT

The invention relates to a method for joining a cluster comprising a plurality of communicating electronic devices. It also relates to any electronic device implementing said join method and any system comprising such a device. The latter advantageously comprises a processing unit, a data memory containing the value of an identifier dedicated to the device and a record to contain the current value of an identifier of a device acting as cluster head and a datum expressing the capacity of the latter to perform a specific service. The device also comprises a program memory containing instructions of a program the execution or interpretation of which by the processing unit causes the implementation of the join method.

18 Claims, 2 Drawing Sheets

(51) Int. Cl.
  *H04L 12/24* (2006.01)
  *H04L 29/08* (2006.01)
  *H04W 4/00* (2009.01)

(58) Field of Classification Search
  USPC .......................................................... 709/226
  See application file for complete search history.

(56) References Cited

OTHER PUBLICATIONS

Haidar Safa et al., "A cluster-based trust-aware routing protocol for mobile ad hoc networks", Wireless Networks; The Journal of Mobile Communication, Computation and Information, Kluwer Academic Publishers, DO, vol. 16, No. 4, May 20, 2009, pp. 969-984.
Tony Ducrocq et al., "Energy-based clustering for wireless sensor network lifetime optimization", 2013 IEEE Wireless Communications and Networking Conference, Apr. 1, 2013, pp. 968-973.
Wendi B. Heinzelman et al., "An Application-Specific Protocol Architecture for Wireless Microsensor Networks", IEEE Transactions on Wireless Communications, IEEE Service Center, Piscataway, NJ, US, vol. 1, No. 4, Oct. 1, 2002, pp. 660-670.

\* cited by examiner

METHOD FOR JOINING A CLUSTER OF COMMUNICATING ELECTRONIC DEVICES VIA A WIRELESS NETWORK, ASSOCIATED SYSTEM AND ELECTRONIC DEVICE IMPLEMENTING SAID METHOD

This invention concerns a method for joining a cluster of communicating electronic devices, said method being implemented by a processing unit of one of said electronic devices communicating with peers via a wireless communication network.

The invention also concerns a system comprising a plurality of devices implementing such a join method.

By way of a non-limiting example of a preferred application, the invention will be described through an application regarding the collection of parameters such as, for example, temperature, humidity, light, vibration, impact, etc., connected with the internal and/or external environments of containers of goods or merchandise. According to the said example of application, the said containers are clustered together, stacked in a storage area or movable on a transport platform such as a container ship, a goods train or any other suitable transport platform. Each container cooperates with one of the said communicating devices. The latter are tasked with collecting and routing said parameters through service messages to peer devices acting as a "cluster head", one of whose missions also consists in implementing a specific service. This service may, for example, involve aggregating the data collected by the communicating devices and broadcasting said data, after their aggregation, to a remote entity via a long-range or long-distance connection such as a satellite or radio-telephone connection. The invention will not, however, be limited to this single example of application. More generally, a device acting as a "cluster head" will be tasked with implementing a given service with regard to data collected and routed by its peers, said given service possibly concerning a supervision or management of alarms, instead or in addition to linking up with a remote entity.

Figure 1:
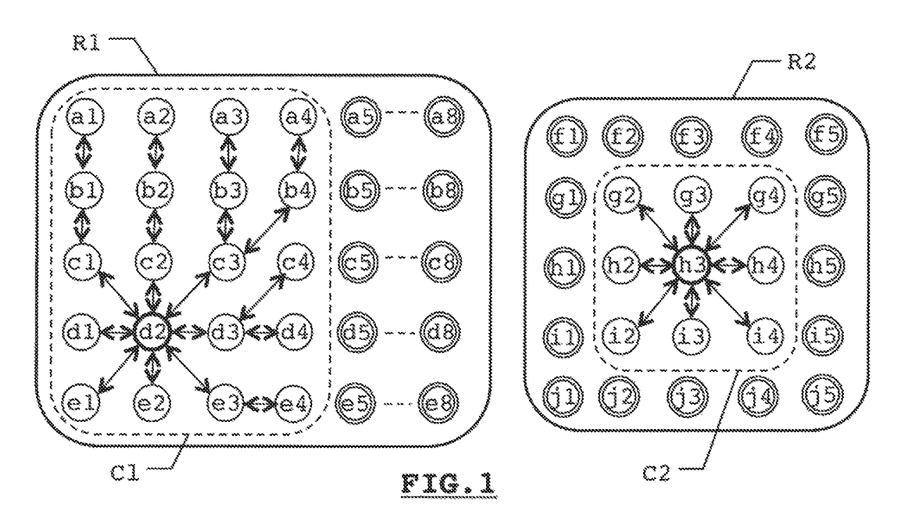
FIG. 1, previously described, shows two examples of configurations of a single-hop or multi-hop wireless communication network respectively.

There are numerous types or configurations of networks of communicating objects. FIG. 1 schematically represents two wireless communication networks R1 and R2. Whichever system is operated, each communicating device, equally and generally called a "node" within such a network, implements a communication method that allows it to exchange data and/or service messages with a third-party node or peer. Thus network R1 adopts forty communicating electronic devices duly indicated in FIG. 1 by reference numerals: a1 to a8, b1 to b8, c1 to c8, d1 to d8 and e1 to e8. For its part, network R2 adopts twenty-five communicating electronic devices, duly indicated in FIG. 1 by reference numerals: f1 to f5, g1 to g5, h1 to h5, i1 to i5 and j1 to j5.

Whether a "single-hop" network such as, for example, network R2 described with regard to FIG. 1, or a "multi-hop" network such as, for example, network R1 described with regard to FIG. 1 is used, a first node that we shall call the "source", can prepare a service message, shown in FIG. 1 by a double arrow, containing data connected with, by way of a non-limiting example, a parameter measured by a sensor cooperating with said first node, addressed to a second "destination" node.

In a single-hop network, communication between the first and second nodes is direct. By contrast, in a multi-hop network, this communication can be indirect. Thus, a message addressed from a "source" node can be relayed by one or more "third-party or intermediate" nodes, whose respective roles involve relaying said message emanating from the "source" node so that it can ultimately be routed to and accepted by the "destination" node. In this case, the nodes take the form of clusters such as, by way of example, clusters C1 and C2 surrounded by a dotted line in FIG. 1. The path followed by a service message emanating from a "source" node and heading for a second "destination" node via one or more "relay" nodes is usually called a "route". Thus, according to FIG. 1, a message transmitted from node a4 to node d2, will be successively relayed by intermediate nodes b4 and c3.

Communication within single-hop or multi-hop communication networks is usually achieved by radio. Communication is usually short-range, i.e. in the order of a few meters to a few tens of meters, so that the service messages are broadcast from one to another between the different nodes. When data are to be routed to a server or more usually to a remote entity, a second method of communication is used, for example, GSM (Global System for Mobile Communications) or GPRS (General Packet Radio Service) or even a satellite link.

Exchanges between nodes, processing operations or calculations implemented by the latter based on the data exchanged, as well as the possible and remote routing of data collected within a network or cluster of communicating devices, are all actions that involve the consumption of electrical energy.

Figure 2:
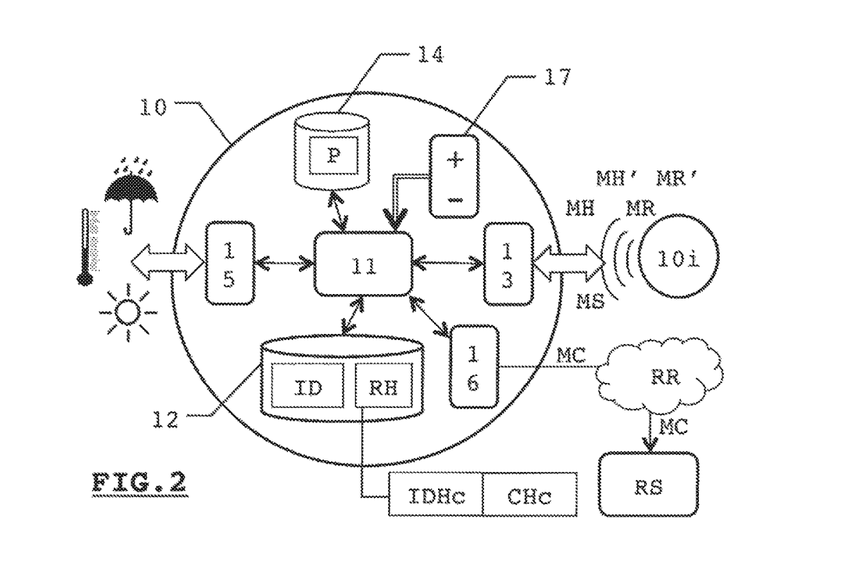
FIG. 2, partially previously described, shows the operational architecture of a communicating electronic device according to the prior art and according to the invention when the latter is adapted to implement a method for joining a cluster of devices communicating with peers via a wireless communication network, said method being in accordance with the invention.

As FIG. 2 shows by way of a preferred embodiment, a node generally and mainly consists in an electronic device 10 comprising a processing unit 11, for example in the form of one or more microcontrollers, cooperating with a data memory 12, possibly a program memory 14, said memories possibly being separate. The processing unit 11 cooperates with said memories 12 and 14 by means of internal wire communication buses or by coupling. Usually, an electronic device 10 comprises one or more sensors 15 measuring a physical parameter relating to the environment of the device 10. This sensor can measure the surrounding temperature, rate of humidity or the presence/absence/intensity of light. The device 10 also comprises first means of communication 13 cooperating with the processing unit 11 and ensuring a wireless proximity communication with any other electronic device 10i located within communication range. It can also comprise second means of communication 16 of the "long distance" type cooperating with the processing unit 11. These second means of communication allow said device 10 to transmit data to a remote entity, for example an RS server, via MC messages broadcast by an RR network using, for example, GSM, GPRS or satellite technologies. In order to operate, i.e. in order for the processing unit 11 to implement a method resulting from the interpretation or execution, by the said processing unit, of program instructions P written in the program memory 14, the device 10 comprises an electrical energy source 17, in the form of one or more batteries for example. A node's ability to communicate or simply to operate is directly linked to the remaining and available energy capacity of said node.

Some designers have attempted to create networks or communication methods, implemented by nodes within a network or a cluster, in order to preserve the overall capacity in electrical energy of the network or cluster. Broadly speaking, a first approach involves spreading the energy cost arising from the exchanges between nodes across all of the said nodes in the network or cluster. Attempts have also been made to spread the energy consumption arising from the processing performed on the data collected, for example a long-distance transmission, over the majority of the nodes, thus sharing the electrical consumption over a plurality of nodes. Thus, regardless of whether the contactless communication is in a single-hop or multi-hop configuration, a node can be arbitrarily designated as a "network head" or at least as a "cluster head", and will be referred to as "head". In FIG. 1, a device acting as a head is shown encircled by a thick line. This device is represented by node d2 for network R1 and node h3 for network R2. Nodes d2 and h3 thus act as heads for clusters C1 and C2 respectively. In this way, the energy consumed, particularly in order to remotely broadcast data collected within a network, is shared over a plurality of nodes. As a variation, the heads can be randomly designated or, more precisely, can randomly designate themselves respectively as head, provided that they have sufficient hardware and/or software means to implement a specific service.

As an example, the "LEACH" method, as described in particular by the document entitled "An Application-specific Protocol Architecture for Wireless Microsensor Networks" (W. Heinzelman, A. Chandrakasan, H. Balakrishnan—IEEE TRANSACTIONS ON WIRELESS COMMUNICATIONS, Vol 1, No 4, October 2002), makes it possible, in a single-hop network, to randomly designate a node to become a head. The other nodes belonging to the cluster of said head, nodes that we shall call "members", address their service messages to the cluster head, and thus to the head. In FIG. 1, each member node is circled by a thin line. Thus, within network R2, head h3 communicates directly with nodes g2 to g4, h2 and h3, as well as with nodes i2 to i4. The head collects said data transmitted by different member nodes, processes them, aggregates and even consolidates them and triggers, for example, a long-range transmission to a remote entity, such as an RS server, as described with regard to FIG. 2. According to this known technique, once a node has assumed the role of head, this node cannot again resume such a role before the expiry of set period. A new member node is then randomly designated head, thus ensuring continuity of service. In order for a node, that we shall call "loose", encircled by a dotted line in FIG. 1, to be able to join a head and thus form a new cluster or rejoin an existing cluster, a loose node located within radio range of a node promoted to head is arranged to receive an MH enrollment message emanating from said head, usually transmitted in the form of a broadcast of MH enrollment messages to any node located within radio range of the head. Through network R2, FIG. 1 describes the resultant of a transmission of an MH message transmitted from node h3, designated to act as head, an MH message transmitted in short-range broadcast mode to the nodes located within communication range, in this case, nodes g2 to g4, h2 and h4, as well as nodes i2 to i4, originally loose nodes, like other nodes, such as, in a non-exhaustive manner, nodes f1 to f5, shown by the double-lined circle in FIG. 1. On receiving said MH enrollment message, a loose node, for example node h4, updates its data memory, said memory cooperating with its processing unit to write therein the head's coordinates or identifier, i.e. the identifier of node h3 in the case of FIG. 1. The previously loose device h4 or loose node becomes a member of cluster C2, i.e. a member node, circled by a thin line. Device h3, acting as a cluster head or head, becomes the recipient of any MS service message containing data collected by device h4 newly a member of cluster C2 like the other member devices of said cluster, namely g2, g3, g4, i2, i3 and i4. Thus, the said nodes g2 to g4, h2 and h4, as well as nodes i2 to i4, formerly loose nodes, become member nodes, shown in single-lined circles in FIG. 1. The transmission of an MH message by node h3 is of limited range. Also, nodes located out of range do not receive the MH message as an intelligible message or indeed do not receive the message at all. Network R2, being of the single-hop type, the nodes being out of range of h3, such as nodes f1 to f5, g1, g5, h1, h5, i1, i5 or even nodes j1 to j5 remain as loose nodes, shown in double-lined circles. Cluster C2 comprises only node h3, acting as head, and the member nodes (i.e. having accepted the enrollment of h3).

A transposition of the LEACH teaching in the context of a multi-hop network, like network R1 described with regard to FIG. 1, could lead us to assume that the nodes, becoming members of a cluster comprising a node acting as a cluster head, would write, in their respective data memories, the route, i.e. the identifier of the node acting as head and at least the identifier of the node having relayed the enrollment message of the said head or even, as a variation, the identifiers of the intermediate nodes separating it from the said head. Thus, by way of example, node C2 would write the identifier of head d2, having directly received an MH enrollment message from said node d2. Node b2 would, for its part, write in addition to the identifier of node d2, that of node c2 having relayed the MH enrollment message of d2 for the benefit of node b2.

Such an approach enables, in theory, or at least according to a perfect method of application, the total energy resources of a communication network comprising a plurality of communicating nodes to be conserved. In practice or in reality, and particularly in fields of application or use of such a communication network connected with the transportation of containers cooperating with communicating electronic devices, such a solution is not relevant or at least less efficient.

We will now explain, by way of a preferred but non-limiting example of application, the operation of a wireless communication network the nodes of which register, collect and transmit measurements connected with a plurality of containers, such as containers of goods or merchandise. Let us imagine that each container is associated with an electronic communicating device implementing a communication method such as the LEACH protocol. According to this hypothesis, each communicating electronic device associated with a container acts as the node within the wireless network, such as network R2 described with regard to FIG. 1. Let us imagine that the method of communication between nodes is made by radio. Apart from the fact that a communication method such as the LEACH protocol requires a single-hop approach, thus requiring that each node must be capable of communicating directly with a head, the relative arrangement of the containers, for example on a ship, in a storage area or on any road or rail transport platform, creates an application context in which a node designated as head might not be capable of fulfilling its mission, involving, for example, transmitting aggregated data to a remote unit, due solely to the fact that it is positioned in a stack of containers for example. In fact, numerous obstacles are created by a transport platform and/or a storage space, due to the partitions or partial confinements dictated by the structure housing the containers or even by the interactions caused mutually by the containers themselves, the stacking of which may lead to a degradation or even the loss of a head's ability to transmit data long distance. The risk of experiencing a loss of data and slowness in routing said data, but also unnecessary and inappropriate energy costs to "liven up" a cluster whose head would be incapable of efficiently ensuring its function or service, is very high. This risk is even higher if the random selection of consecutive heads would result in an unproductive "choice". Neither is the transposition of such teaching to a multi-hop network relevant. In fact, although it allows the size of a cluster, in other words the number of member-nodes of said cluster, to be increased, the random selection regardless of the relative position of a node as regards its peers is likely to increase energy costs in attempting to form clusters, ultimately not very communicative ones, as heads are selected.

The invention overcomes the large majority of the drawbacks of known solutions. By forming a particularly innovative and highly efficient wireless communication network, whatever the relative arrangement of the nodes and whatever the context of application or operation of said network, be it single-hop or multi-hop, the invention optimizes the overall capacity of the network so as to ensure a specific service based on data collected by the different nodes. The main originality of the method for joining a cluster of communicating devices lies in the methods of selecting heads, if and only if the latter have the actual capacity to assume their role of cluster head, for example in order to transmit data by a method of long-distance communication. Each node implementing a method according to the invention can decide whether to act as a head, from the moment said node knows that it is in a situation of efficiently fulfilling its role. Moreover, any loose node can decide whether to join a cluster of nodes, the said cluster comprising the said head, advantageously self-designated.

Some of the numerous advantages of the invention are that it makes it possible:
  to share in a meaningful way the energy costs over the network's nodes, thus prolonging said network's capacity to provide a service that is unrivalled in comparison to the state of the art;
  to design a network of nodes that is automatically adaptable and operational as changes in the relative positions between the nodes occur or the operating conditions of said nodes change, for example, during the handling, storage or transportation of containers, each associated with an electronic device according to the invention;
  to promote the reliability of service (for example, transmitting data long distance) giving each node according to the invention the opportunity of determining its role within the network and of referring at any time to the best head for the service in question, whilst minimizing the conflicts or modification of clusters when concurrently selecting a plurality of heads located within radio range of common nodes.

To this end, the invention concerns a method for joining a cluster comprising a plurality of communicating electronic devices, said method being implemented by a processing unit of one of said communicating electronic devices or of a communicating electronic device foreign to said cluster. The said electronic device comprises, in addition to the said processing unit, a data memory, first communication means ensuring a wireless proximity communication with any other electronic device located within communication range, said memory and said communication means cooperating with said processing unit. The data memory contains the value of an identifier dedicated to the communicating electronic device and a record to contain the current value of an identifier of a communicating electronic device acting as a cluster head. So that the device, implementing said method, can join a cluster comprising a device acting as a cluster head, said method comprises:
  a step for receiving an enrollment message generated and transmitted by a third-party communicating electronic device eligible to act as a cluster head, said enrollment message comprising the identifier of the device that transmitted said enrollment message and a datum expressing the capacity of said transmitting device to ensure a given service;
  a step for decoding said enrollment message and deducing therefrom said identifier of said device that transmitted the enrollment message and the datum expressing said capacity;
  a step for updating the record so that said record memorizes, as a current value of the identifier of the device acting as a cluster head, the value of the identifier of the device transmitting the decoded enrollment message and the value of the datum expressing the capacity of the transmitting device to ensure said service, said device implementing said method becoming a cluster member.

In order particularly to share in a meaningful way the energy costs over all of the nodes of a particularly reliable network and prolong the capacity of said network to perform a service, the step of said method in order to update the record is not performed unless the datum expressing said capacity is greater than or equal to a minimum specific requirement threshold, said device implementing said method becoming a cluster member of which the device acting as a cluster head contains an identifier whose value is equal to the current identifier value memorized in said record.

In order for a device implementing a join method according to the invention to be able to select a suitable candidate from a plurality of devices having transmitted an enrollment message, and even arbitrate a competition between two or more devices designated to act as cluster heads, a join method according to the invention may include a step after the step for decoding an enrollment message and before the step for updating the record containing the current value of the identifier of the device acting as cluster head. This step may involve:
  reading in said record the current value of the identifier of the device acting as cluster head;
  comparing said current value with that of the identifier of the device that transmitted the decoded enrollment message.

If said identifier values are separate, the step for updating the record cannot be advantageously performed unless the datum expressing the capacity of the device transmitting the enrollment message to ensure a service is greater than or equal to the value of the datum expressing the current capacity of the device acting as cluster head plus a specific constant.

In the context of implementing the invention in a multi-hop network, a join method according to the invention may include a step after the step for updating the record, of encoding and transmitting via the communication means a relayed enrollment message containing the identifier of the device written in the record containing the current value of the identifier of the device acting as cluster head, the datum expressing the capacity of said device to be capable of ensuring the service, as well as the identifier of the device implementing said join method and acting as a cluster member relaying the enrollment message.

According to this variation, the step for decoding a relayed enrollment message can advantageously involve deducing from said message the identifier of a device acting as a cluster member and having relayed an enrollment message. The step for updating the record can, for its part, also consist in entering in said record the said identifier of the cluster member device, which relayed the enrollment message, the paired identifiers of the cluster member devices and cluster head thus constituting route information.

In order to contribute to the specific service, a join method according to the invention and implemented by a cluster member node may include a step for transmitting a service message to the device acting as cluster head for the service in question.

When a device acting as cluster head no longer wishes to act as such, it can transmit a cluster destruction message. A join method according to the invention may comprise:

a step for receiving a cluster destruction message generated and transmitted by a third-party communicating electronic device formerly being entitled to act as a cluster head, said cluster destruction message containing the identifier of the device that transmitted said cluster destruction message;

a step for decoding said cluster destruction message and for deducing therefrom said identifier of said device that transmitted the cluster destruction message;

a step for updating the record containing the current value of an identifier of a device acting as cluster head in order to delete said current value or replace it with a predetermined value expressing an absence of identifier of a device acting as cluster head, said device implementing said method becoming loose, said record update being performed only if the value of the identifier deduced from the cluster destruction message is identical to the current value entered in said record.

A join method according to the invention can allow any device implementing it to designate or select itself to be a node acting as a cluster head, regardless of the methods of joining a cluster. However, in order for this selection to be appropriate, whatever the operating conditions of said network, said join method may comprise:

a step for assessing the capacity of the device, implementing said method, to ensure a specific service, said step involving estimating one or more operating parameters of said device and producing the datum expressing the capacity of said device to ensure the specific service;

a step for comparing the datum expressing the said ability at a minimum requirement operating threshold;

a step for encoding and transmitting an enrollment message, containing the identifier of said device as well as the datum expressing the capacity of said device to ensure said specific service, to any communicating device located within communication range, said step only being implemented if the datum expressing said capacity is greater than or equal to said minimum requirement operating threshold.

As stated above, a device acting as a cluster head and implementing a method according to the invention can detect when it no longer meets the necessary conditions for effectively ensuring the specific service. Before finding itself in operational failure, it can therefore resign from its role as cluster head, said resignation resulting in the destruction of the node cluster concerned.

For this reason, the previously mentioned step for assessing the capacity of the device may be iterative.

Furthermore, said method may include a step after the transmission of an enrollment message, for encoding and transmitting a cluster destruction message, said message containing the identifier of said device, to any communicating device located within communication range, as soon as an occurrence of the step for assessing the capacity of the device to ensure the specific service indicates that one parameter among the operating parameters of said device is below a required operational minimum, indicating insufficient capacity to ensure the service.

Whether it is to self-select as or put an end to a device being capable of acting as cluster head, the join method allows operating parameters to be compared to thresholds or minimum levels. Depending on whether the device comprises an electrical energy source powering the processing unit, the data memory or communication means, the invention envisages that one of said operating parameters can describe the level of electrical energy available from the electrical energy source.

As a variation or in addition, depending on whether said device comprises second long-distance communication means cooperating with the processing unit, the service consisting in transmitting data to a remote entity via said long-distance communication means, the invention envisages that one of said operating parameters can describe the transmission power of a signal by the long-distance communication means.

Whatever the variation of a join method according to the invention, and in order to adapt a communicating electronic device so that it can implement such a method, the invention envisages a computer program comprising a plurality of program instructions that, if they are:

previously loaded in a program memory of an electronic device also comprising a processing unit, first communication means ensuring a wireless proximity communication with any other electronic device located within communication range, a data memory recording the value of an identifier dedicated to the device and a record for containing the current value of an identifier dedicated to the device and a record for containing the current value of an identifier of a device acting as a cluster head, said memories and communication means cooperating with said processing unit;

executed or interpreted by said processing unit, causes the implementation of a join method according to the invention.

According to a third object, the invention also relates to an electronic device comprising a processing unit, a data memory, a program memory, first communication means ensuring a wireless proximity communication with any other electronic device located with communication range, said memories and communication means cooperating with said processing unit, the data memory containing the value of an identifier dedicated to the device and a record to contain the current value of an identifier of a device acting as a cluster head. For a device to be capable of acting as a network according to the invention, the program memory of said device contains the instructions of a program as mentioned above.

According to a fourth object, the invention relates to a system comprising a plurality of communicating electronic devices according to the invention, i.e. implementing a join method according to said invention.

According to a preferred application, such a system can advantageously comprise a plurality of containers of goods and solid, fluid or liquid merchandise, said containers cooperating respectively with the communicating electronic devices, the latter each comprising a sensor cooperating with the processing unit to measure and collect a parameter relating to the internal and/or external environments of said containers.

Other characteristics and advantages will emerge more clearly from the following description relating to an embodiment given purely by way of a non-limiting example and from the examination of the accompanying Figures, in which.

A communicating electronic device according to the invention is similar to a known device 10, as previously described with regard to FIG. 2.

On this basis, a communicating electronic device according to the invention comprises a processing unit 11, consisting in one or more microcontrollers in charge, among others, of processing data. Said data are advantageously, in total or partially, written in one or more data memories 12, usually electrically erasable and writable. The memory 12 can advantageously comprise a non-erasable section, physically isolated or simply arranged so that a write or erase access is required, or requiring compliance with an authentication procedure. Said advantageous section of the memory 12, to which access for amendment is restricted, enables in particular an ID dedicated to the communicating electronic device to be written therein. Advantageously, but not compulsorily, a device 10 may also comprise one or more program memories 14 to record one or more programs P, or more generally one or more sets of program instructions, said program instructions being intelligible to the processing unit 11 and whose execution or interpretation by said processing unit causes the implementation of a method of data processing or operation of the device 10. The latter also comprises first communication means 13 ensuring a wireless proximity communication with any other electronic device, such as device 10i, provided that the latter is within communication range. Through said means 13, device 10, or more precisely its processing unit 11, can transmit and/or receive messages to or from third-party devices located within communication range. These messages can be of any sort. According to the invention, we will distinguish different types of messages, among which we can mention, non-exhaustively, MS data messages with regard to a particular service S, MH enrollment messages and MR cluster destruction messages.

Some communicating devices can benefit from the electromagnetic field created by the network to draw therefrom sufficient electrical energy to ensure their operations, if only for a brief period of time. However, in order to ensure continuous operation and/or implement processing operations requiring more energy, a communicating electronic device 10 according to the invention may advantageously comprise its own electrical energy source 17, chiefly powering the processing unit 11 or indeed any other element constituting said device in need thereof. Such a source 17 usually takes the form of a battery or a plurality of batteries. According to the preferred application context, with particular regard to monitoring containers, but this particular context does not limit the field of use of the invention, a communicating electronic device 10 can comprise one or more sensors 15 cooperating with the processing unit 11. This sensor can measure one or more parameters relating to the internal and/or external environments of said containers and produce data relating thereto. By way of example, as shown in FIG. 2, a sensor can measure the temperature and/or humidity inside a container, the darkness or loss of darkness inside the enclosure revealing unexpected opening of the container as well as impacts. If necessary, the sensors can cooperate with the processing unit of a device via probes or conductive ribbon cables, particularly if a device 10 is to be affixed to the external wall of a container when the internal environment of said container is to be monitored by means of said device 10. Said device 10 can also comprise a clock, enabling it to timestamp the measurements collected, said clock not being shown in FIG. 2.

Depending on the desired services to be performed with the aid of the communicating electronic devices according to the invention, the latter can comprise additional and optional means. By way of a preferred example, a service may consist in:

collecting data from nodes of a network of communicating electronic devices according to the invention, for example with regard to values measured by said nodes; aggregating said data collected from a plurality of nodes, then processing MC messages encoding consolidated service data to be sent to a remote entity, such as an RS server.

In order to transmit such MC messages, a device 10 advantageously comprises second means of long-distance communication 16 cooperating with the processing unit 11. Such communication can be achieved via an RR network, GPRS, satellite or indeed any other appropriate means of communication. The different internal constituent parts of the electronic device cooperate with the processing unit 11, advantageously by wire buses or couplings. The device 10 comprises a case advantageously housing fixing means to affix the device 10 onto a support requiring to be monitored, in this case a container according to the preferred example of application.

In order to implement the invention, it is necessary to act on the operation of the processing unit, more precisely on the communication method implemented by said processing unit. This method will be described later with regard to FIG. 3. A preferred method of adaptation consists in providing a program or more generally program instructions mutually arranged in order to implement the said method during the execution or interpretation of said program instructions by the processing unit. Advantageously, said program P is loaded into the program memory 15 during the assembly of said device or by downloading said program into the memory 15 after the said device assembly phase.

The invention lies chiefly in implementing a single-hop or advantageously a multi-hop network for which each node consists in a communicating electronic device such as the device 10 previously described. A node of this network is adapted to implement a method for joining a cluster of devices, such as method P100 described below with regard to FIG. 3. For this implementation, the invention envisages that the data memory 12 comprises, in addition to the ID identifier dedicated to the communicating electronic device, a record RH provided to comprise the current value IDHc of an identifier of a communicating electronic device acting as a cluster head, such as nodes d2 or h3 according to FIG. 1.

According to the invention, when a device chooses to join a cluster in which one of the nodes acts as cluster head, this joining is exclusive. In other words, a node cannot be a member of separate clusters, i.e. having respectively separate head nodes, for the same service. According to the invention, as we will see below, a node joining a cluster chooses the best head for the said service.

However, the invention envisages that a node can be attached to a plurality of heads, if the said heads are assigned to implementing separate services: for example, one head for transmitting long-distance data (service Si) and a second head for implementing an alarm-management service (service Sj) on a site.

On this basis as with the LEACH solution previously described, the invention allows clusters of communicating electronic devices to be created, such as clusters C1 and C2 of networks R1 and R2 described with regard to FIG. 1, said clusters comprising a device acting as a cluster head or head, such as nodes d2 or h3 described with regard to FIG. 1, the other devices acting as members of the said cluster such as, non-exhaustively, nodes c2 or i3 described with regard to FIG. 1. The role of a member mainly involves collecting information such as, for example, environmental parameter measurements, translating them into data then encoding said data into the form of an MS service message to a cluster head or head capable of ensuring the specific service. This head recognizes said MS service messages then implements the specific service S. For example, this service may involve aggregating the data transmitted to the head from several members via MS messages, then implementing a long-distance transmission of said aggregated or consolidated in the form of MC messages to a remote entity RS.

Conventionally an MS service message, addressed from a cluster member to a head, is structured so as to contain information characterizing the type of message (MS, MH, MR, etc.), an identifier of the source node, also usually a member, an identifier of the recipient node, in this case a head, and even an identifier of an intermediate node in the case of a multi-hop network, data, for example with regard to values measured by a sensor of the device and possibly a redundancy code or even a cryptogram or any other control information allowing a recipient node to decode said service message and to use it or relay it. An MS message, like any other message circulating in the network, can trigger acknowledgement of receipt MACK messages, transmitted by the recipient of the message to the source node. After a timeout, if no MACK message is received, a new transmission of the MS message is triggered, for a limited number of iterations, following which, the source node considers that the route or communication with the recipient is not, or is no longer, available. This source node can decide to abandon the cluster and resume loose node status.

The joining of a loose node to a node acting as cluster head or head is similar to that implemented in the LEACH solution. However, the methods of electing a head and the methods of joining a loose node to become a cluster member are very different.

Contrary to the state of the art, the selection of a communicating electronic device does not result from a random event. Quite the opposite, according to the invention, only nodes with a real capacity to ensure a specific service are capable of designating themselves heads. For their part, the other nodes are free to arbitrate a competition of heads and choose the head that appears to be the best candidate to implement the service to which they contribute.

Figure 3:
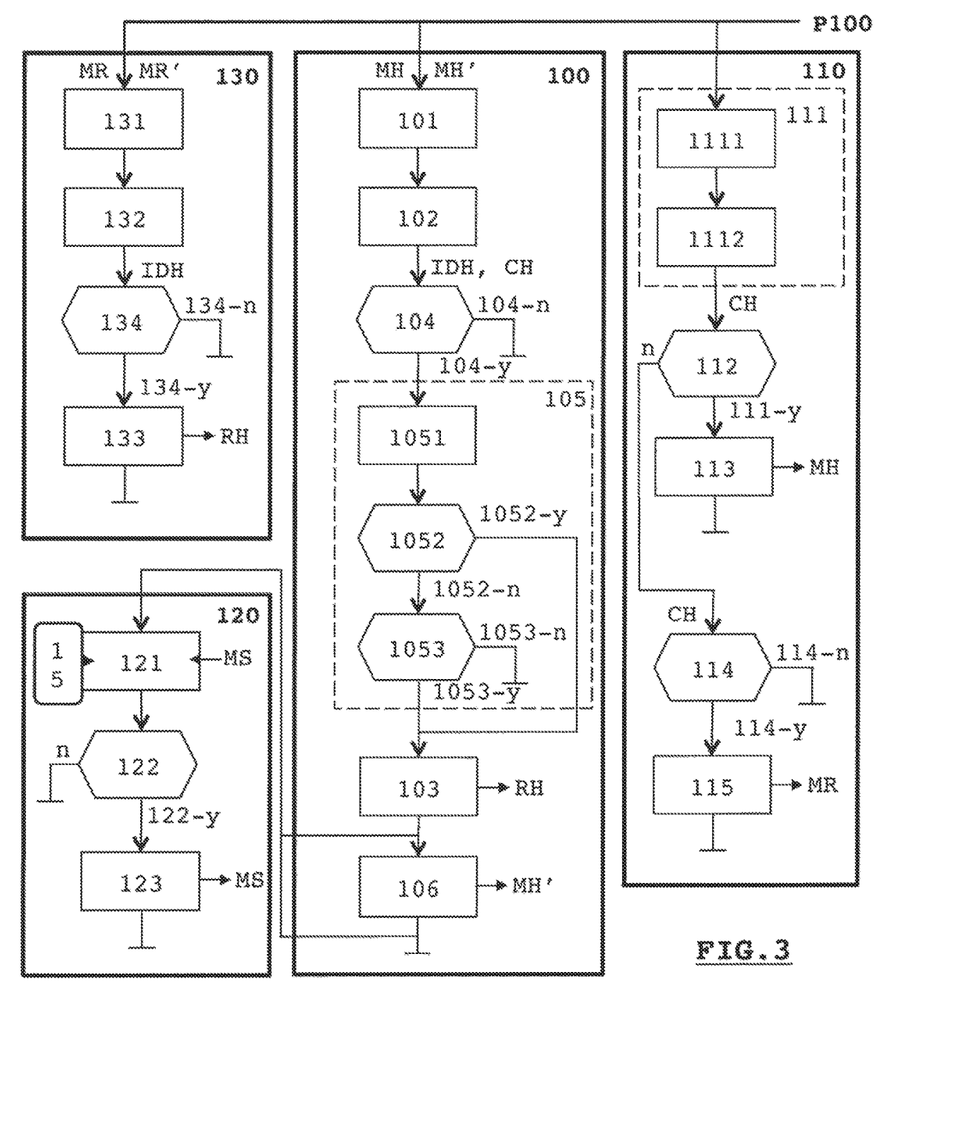
FIG. 3 represents a description of operation of said join method according to the invention.

FIG. 3 shows a communication method P100 implemented by a device according to the invention, such as, by way of example, a device 10 described with regard to FIG. 2.

Firstly, we shall describe the processing operation 110 implemented by a communicating electronic device 10 according to the invention, implementing a method P100. The latter comprises a step 111 to assess the capacity of the device 10 to ensure a specific service S so that it may designate or select itself as head. This step 111 may consist firstly in assessing, in 1111, one or more operating parameters of the device 10 to test its capacity to correctly ensure said service. By way of a preferred example, let us suppose that the said service consists in aggregating some data collected and deduced from MS service messages, consolidating said data, encoding an MC message and transmitting the latter by long-distance communication means 16 to a remote server whose mission is to track containers cooperating with the communicating devices. In order to be able to ensure this service, the device must obviously comprise suitable communication means, such as means 16. Moreover, such communication, for example of the GPRS type, mobilizes a large quantity of electrical energy just to initiate the connection. It is therefore imperative that a device, acting as a cluster head, has a sufficient energy reserve to support this stress. Moreover, it is also preferable that the transmission power of a signal by GPRS is the best possible. In fact, a low transmission power would result in slowness and therefore an increased transmission time involving particularly high levels of electrical energy consumption as well as new attempts at successive transmissions in the event of failure or even out and out loss of MC messages.

According to a first embodiment, the invention envisages that step 1111 may consist in a self-test or self-assessment of the device, for example of the level of the battery 17. The processing unit 11 can also, for example, test the transmission power of a GPRS signal. Said processing unit can also examine in 1111 other operational parameters of the device, for example, the number of transmissions of MC messages. For example, a counter of sent MC messages can be implemented by the processing unit 11, a counter whose value can be written in the memory 12. The assessment of the stress of device 10 as head may consist in reading said counter in the memory 12.

Method P100 advantageously causes the implementation, by the processing unit of device 10, of a step 112 to compare the estimated operating parameters to predetermined operating minimums. Beforehand, a CCH datum is produced in 1112, expressing the capacity of said device 10 to ensure the specific service S. By way of example, the production of said CH datum by the processing unit may involve assessing an equation or a predefined function producing a metric integrating said estimated parameters, possibly respectively weighted in order to favor one parameter over another. For example, an estimation of the GPRS transmission power may involve calculating a ratio corresponding to the estimated transmission power of a test signal, divided by a constant describing a typical maximum power, i.e. under optimum transmission conditions.

With regard to the level of battery or more generally of the energy source 17 of the device, step 1112 may force the processing unit to calculate a ratio corresponding to the estimated available energy in terms of energy when fully charged.

More generally, this CH metric characterizing the capacity of a device to act as a cluster head can be calculated, in a non-limiting manner, by evaluating an equation such as:

$$CH = K_1 \cdot f_1(p_1) + K_2 \cdot f_2(p_2) + \ldots K_i \cdot f_i(p_i)$$

where $K_1, K_2, \ldots, K_i$ constitute weights, possibly separate, $f_1(\ ), f_2(\ ), f_i(\ )$ are possibly separate calculation functions, for example the development of a ratio and $p_1, p_2, \ldots, p_i$ are operating parameters of the device, including, by way of non-limiting example, the level of electrical energy of the source 17, a long-distance transmission power, the size of a memory available to record data, a calculation power, etc.

The CH datum can thus be likened to a real value. It can also be composite, i.e. be a structured datum, containing each operating parameter of the device or containing, instead of one of said operating parameters, a specific function of one of said operating parameters.

Since a CH datum is produced in 1112, a method according to the invention advantageously comprises a step 112 to compare the said CH datum, which expresses the capacity of the device to ensure a specific service, to a minimum requirement operating threshold. If the CH datum is structured, the same applies for the said threshold. Comparison 112 would therefore consist in as many independent comparisons of an operating parameter to particular minimum requirement operating thresholds, to which a combinational logic would be applied (such as AND, OR, etc.).

If step 112 reveals that the CH datum is greater than or equal to said minimum requirement operating threshold (link indicated as 112-y in FIG. 3), method P100 advantageously comprises a step 113 to encode and transmit an MH enrollment message. This MH message contains the identifier of the device, which we indicate as IDH, as the identifier of a device selected to act as head, as well as the CH datum expressing the capacity of said device to ensure the specific service S. This MH message may contain a datum characterizing the said service S. The MH message produced in 113, is distributed (for example broadcasted) by the first communication means 13 of said device under the action of the processing unit implementing said method. Any communicating device located within communication range, such as device 10i described in FIG. 2, can receive said MH message.

Step 111 to estimate the capacity to ensure a given service can be achieved iteratively, for example, according to predetermined time periods or any other triggering event. This event can, for example, consist in the reachment of a predetermined number of transmissions of MC messages. The duration of this evaluation period will be determined rationally on the basis of, in particular, the number of nodes comprising the network. In fact, too long a period increases the risk that the devices acting as heads will remain as such when they are no longer capable of ensuring the service efficiently. Too short a period obviously increases the ability of the network to exploit the efficient heads but involves a large number of transmissions and receipts of enrollment messages as well as numerous formations and destructions of clusters, thus reducing the total energy capacity of said network.

On completing production of the CH datum in 1112, if the operational minimums in 112 are satisfactory, a new MH enrollment message is transmitted. We shall see later how a device according to the invention uses the receipt of said MH enrollment message, particularly in order to join a cluster or remain a member of said cluster.

The invention also envisages that if, by contrast, the 112 comparison confirms that the operational parameters of a device do not meet the operational minimums in 112, no enrollment message is transmitted. Thus, any electronic device according to the invention which is not capable of ensuring a given service, even when theoretically it has the hardware or software means to do so, cannot be selected as cluster head and form a cluster of communicating devices.

The invention also envisages that method P100 can include a step 114, possibly joined to step 112, to compare the CH datum produced in 1112, to an operational minimum, confirming insufficient capacity to be capable of ensuring the service. This minimum threshold can be predetermined and written, like the threshold used in step 112, in the memory 12. This step 114 and therefore a step 115 that may result therefrom, can advantageously occur after the transmission 113 of an MH enrollment message. If the comparison 114 confirms (link 114-y in FIG. 3) that the device is no longer capable of ensuring the service S, method P100 according to the invention can advantageously include a step 115 to encode and transmit an MR cluster destruction message, advantageously broadcast. This transmission of an MR message, can be performed by the communication means 13 of the device, under the influence of the processing unit 11, implementing method P100. Like an MH enrollment message, an MR cluster destruction message, transmitted from a device previously acting as a cluster head but no longer in a situation to be able efficiently to ensure a specific service S, contains the identifier of said device, indicated as IDR. It can also contain the CH datum characterizing the capacity, or in this case, an incapacity to ensure the service. As a variation, said MR message can simply associate to the identifier of the transmitting device, information characterizing the MR message as a cluster destruction message. We shall see later how the receipt of such an MR message by one or more devices belonging to a cluster is used. This step 115 can advantageously only be triggered if the transmitting device previously acted as a head, so as not to needlessly transmit cluster destruction messages that are irrelevant and also to prevent any improper use of said messages by the receiving nodes. In order for a device according to the invention to be able to detect whether it was previously in a situation to ensure the role of head, the processing unit 11 of said device can, for example, use an MC message transmission counter, as stated above, written in memory 12. During comparison 114, a value of said counter, higher than its initial value, discloses that said device acted as a cluster head. On completing transmission of an MR message, said counter can be reset to the initial value. However, any other action could be implemented by the processing unit 11 in order to validate the implementation of step 115, instead of using the MC message transmission counter. By way of a non-limiting example, such an action can arise from the receipt, by the device acting as head, of an enrollment message emanating from a third-party device, also acting as head and whose datum expressing its capacity to ensure the same service is greater than its own. In this case, the device triggers step 115, thus stepping down in front of better than him. According to this last variation, the invention envisages limiting the number of transmissions of MR cluster destruction messages, the direct consequence of particularly dynamic and fluctuating changes in the capacities of nodes to act as heads, leading to a very sustained competition between numerous heads. This situation can for example arise during transportation by rail of a multitude of containers, each cooperating with a communicating device according to the invention and for which the specific service involves regularly transmitting by GPRS information regarding the contents of the containers. The ability of heads to transmit long distance can be very variable. In order to overcome this difficulty, the invention envisages incorporating a "competitive factor" into the implementation of step 114, for example a positive real number greater than "1", whose value can be written in the memories 12 of the different nodes. Thus, a head, receiving an MH enrollment message emanating from a third-party node, does not strictly compare, at step 114, the CH data expressing the respective capacities to ensure the same service. Step 114 involves comparing the CH datum deduced from the MH enrollment message, multiplied by the competitive factor. Thus, if the said factor exceeds "1", for example "1.25", the node, implementing step 114, is penalized by said factor being used by the competitor. Thus, even if the CH datum of said node expresses a better capacity than that of the head having transmitted the MH message, the application of the competitive factor potentially improves that of the competitor. In this case, the node implements step 115, transmits an MR cluster destruction message and joins the competitor's cluster as a member. This solution makes it possible to limit excessive numbers of cluster creations/destructions compromising the energy capacity of the network. It also makes it possible to limit the number of nodes capable of acting simultaneously as heads. In fact, depending on the service S envisaged, for example involving a long-distance transmission, a too large number of nodes acting together as heads, could, for example, draw too heavily on the network's energy reserves. The competitive factor can therefore be regarded as a parameter that regulates the number of heads and the dynamics of the adaptability of the network to its environment.

We shall now examine the processing 100 performed by the processing unit 11 of a device 10, when implementing a P100 join method, in reaction to receiving an MH enrollment message.

Regardless of the processing operation 110 implemented by the processing unit 11 of a device 10 in order to select itself or be designated as head, said processing unit 11 of a device according to the invention implements a processing operation 100 involving a first step 101 to receive an MH enrollment message generated and transmitted by a communicating electronic device, such as node d2 or node h3, described with regard to FIG. 2. This MH enrollment message contains the IDH identifier of the device transmitting said enrollment message. Method P100 also includes a step 102 to decode said MH enrollment message and to deduce therefrom said IDH identifier. It also includes a step 103 to update a record RH, contained in the data memory 12, said record being provided in order to record the value of the identifier IDH as a current IDHc value of an identifier of a device selected to act as cluster head, for example device d2 or device h3 shown in FIGS. 1 and 2.

The MH message thus decoded also contains a CH datum expressing the capacity of said transmitter device to ensure a given service S. Step 102 to decode said MH enrollment message also deduces therefrom said CH datum. According to the invention, during the update 103 of the record RH, the value of the CH datum expressing the capacity of the transmitter device to ensure the said service S is also written in said record RH. The written value is noted as CHc in order to express the current capacity of the head to ensure the service. In a network, such as network R2 described with regard to FIG. 1, in other words a single-hop network, the device 10 that has just implemented said method P100, becomes a member of the cluster of which the transmitter of the MH message acts as cluster head. This is the case, for example, with devices acting as member nodes of cluster C2 described with regard to FIG. 1. Unlike nodes implementing, for example, LEACH technology, cluster members according to the invention have the certainty that the node acting as head is fully capable of ensuring a given service. The memorization of the capacity of said head in the record RH allows it, on receipt of a new MH message transmitted by another transmitter device, possibly to compare the capacity of the current head with that of a new candidate. We shall examine the case of competition between heads later on, competition arbitrated by member or loose nodes.

The invention also envisages that a node that is already a member of a cluster and/or, as a variation, a loose node can decide to join the node having transmitted an MH message. Thus, according to a preferred variation, step 103 of the join method P100, in order to update the record RH might not be performed unless the CH datum, reflecting the capacity of the node wishing to act as cluster head, is greater than or equal to a specific minimum requirement threshold. Method P100 thus includes a step 104 to compare the datum expressing the capacity deduced in 102 of the RH message at said minimum requirement threshold. Thus, a candidate node 10 for joining a cluster can be more exacting or selective than the minimum criteria for selecting a head. Said minimum requirement threshold used by the candidate node for joining can be a structure similar to that of the threshold used by the head during its self-selection. Said minimum requirement threshold is advantageously written in the data memory 12, or even constitutes a predefined constant settled in the program memory 14. Advantageously, it can be identical for all nodes.

As previously mentioned, MH enrollment messages can be regularly initiated and transmitted by one of more communicating devices located within radio communication range, such as device 10i described with regard to FIG. 2. A device 10, acting as cluster member, can therefore be in a situation of receiving and decoding an MH enrollment message while said device 10 is already attached to a head.

Two cases emerge. According to a first situation, device 10 has already used an MH enrollment message transmitted by a same device acting as a head. The value of the IDH identifier thereof is therefore identical to that of the IDHc memorized in the record RH, said record being contained in the data memory 12 of the device 10. According to a second situation, the value of the IDH identifier deduced from the MH message is separate from the IDHc value. The member device finds itself in a situation of arbitrating a competition between two third-party devices capable of performing the same service.

Method P100 includes a step 105 after the step for decoding 102 an MH enrollment message and before the step for updating 103 the record RH containing the current IDHc value of the identifier of the device acting as cluster head. This step 105 advantageously consists in reading in 1051, within said record RH, the said IDHc current value. Then step 105 consists in comparing in 1052 said current IDHc value to the IDH value of the identifier of the device that transmitted the MH enrollment message decoded in 102. In the case of the first situation, referred to above, said IDHc and IDH values are identical (situation symbolized by the link 1052-y in FIG. 3). The record RH can thus be updated at step 103. In particular, this action allows the CH datum to be updated in record RH. In fact, according to the development of the head's context of operation, its capacity to ensure the service has perhaps changed. It has perhaps degraded, for example due to a lower energy reserve. It has perhaps improved, due to the disappearance of an obstacle that penalized the transmission power of a signal via GPRS.

By contrast, if values IDH and IDHc are separate (situation symbolized by the link 1052-n in FIG. 3), a device capable of acting as head competes with the one that is, in the eyes of member 10, currently the device acting as cluster head. The invention envisages that step 105 can include a step 1053 to compare the CH datum expressing the capacity of the device that transmitted the MH enrollment message to the CHc datum memorized in the record RH and expressing the ability of the device currently acting as cluster head to perform said service S. According to a first embodiment, if the value of the CH datum deduced from the new enrollment message is greater than the CHc value (situation symbolized by the link 1053-*y*), then step 103 is performed in order to update the record RH. The IDHc value takes the value of the identifier that transmitted the enrollment message. Device 10 thus leaves the previous cluster to join that for which the device that transmitted the MH message acts as head. The service messages generated by device 10 will now be addressed to the new head. In the reverse situation, if the value of datum CH deduced from the new enrollment message is less than or equal to value CHc (situation symbolized by link 1053-*n*), then step 103 is not performed, because the transmitter of the enrollment message is less efficient than the current cluster head.

The invention envisages a second embodiment aimed at limiting too frequent changes of heads. In fact, as we shall see later, particularly when implementing a multi-hop network according to the invention, a change in head can cause the transmission of numerous messages within the network and compromise the total energy capacity of the network. In order to limit the number of untimely join changes, particularly if the CH and CHc data, expressing the respective capacities to perform the same service, are very close, the invention envisages favoring a certain "fidelity", although very relative, to benefit the device currently acting as cluster head, even when the latter proves to be less efficient than the device entering the competition. Thus, if the values of the IDH and IDHc identifier are separate (situation symbolized by link 1052-*n*), then step 103 to update the record RH is not performed unless (situation symbolized by link 1053-*y* in FIG. 3) a significant difference, equal to a predetermined constant, advantageously but in no way limiting non equal to zero, exists for the benefit of the enrollment message transmitter device. Step 1053 can therefore be adapted so that the update 103 of the record RH is only performed if the CH datum expressing the capacity of the MH enrollment message transmitter device is greater than or equal to that memorized in the record RH increased by said difference. As a variation or in addition, in the context of a multi-hop network, step 1053 may also include the use of DST information, expressing on the one hand a distance in the number of hops between the member and aspiring head and a distance separating said member from the existing node acting as a cluster head. This DST information can be encoded in an MH message broadcast in a multi-hop network as we shall see later. In this case, step 102 is adapted in order to deduce said DST information from the MH message. The same applies to step 103 in order to enter the DST information in the record RH together with the CH datum. Step 1053 can implement any function exploiting, possibly in a weighted manner, the CH datum and the DST information. Thus, a head, of which the CH datum is less favorable than that of a second head competing with the first, can be favored if it is closer (in number of hops) than said second head. The number of service messages, for example, will be reduced. The DST information thus regulates the size of the clusters in a multi-hop network.

The invention makes it possible to operate a single-hop network or a multi-hop network such as network R1 described above with regard to FIG. 1. According to such a network, it is necessary to be able to relay an MH enrollment message beyond the transmission range of the self-selected device, capable of acting as cluster head. The aim is that said MH message can be used by a device that is loose or a member of a possible separate cluster, in order to create clusters comprising an increased number of members compared to a cluster within a single-hop network, for a similar short-range transmission range.

The invention thus envisages that a join method P100 can comprise a step 106, after step 103, in order to update the record RH of the device implementing said method P100. This additional step 106 involves encoding and transmitting, via the communication means 13, a relayed enrollment message MH comprising the identifier of the device written in the record RH, the latter containing the current IDHc value of the identifier of the device acting as cluster head and the CHc datum expressing the capacity of said device acting as head to ensure a specific service, as well as the identifier of the device acting as cluster member relaying the MH enrollment message emanating from the device acting as head. Later in this document, we shall refer to a "transmitter of an enrollment message" to indicate a device applying to be or acting as head. We shall refer to a "relaying member" or simply a "relayer" to indicate a device not acting as head but simply relaying an enrollment message "transmitted", i.e., for the purposes of this document, initiated by a head. The enrollment message thus relayed, i.e. re-transmitted by a relayer is called a "relayed enrollment message" and is referred to as MH' in order to distinguish it from the original MH "enrollment message" transmitted by the head. As stated above, the invention envisages that said MH' relayed enrollment message can contain DST information expressing the distance, in number of hops, separating the relaying node from the head having transmitted the MH enrollment message. Thus, by way of non-limiting example, if the MH message is relayed once, the DST information is worth "2". If the message is relayed 3 times, the DST information assumes the value "4".

According to this variation, the join method P100 according to the invention can advantageously be adapted so that step 102 to decode an MH or MH' enrollment message also consists in deducing from said decoded message, the value of the identifier of a device acting as a cluster member relaying an enrollment message and possibly the DST information, if it exists. Step 103 to update the record RH contained in the memory 12 of the device having received the MH' relayed enrollment message, also consists in entering in said record, said identifier of the cluster member device relaying the enrollment message, or even the DST distance information. The pair of identifiers of the cluster and cluster head members thus constitutes route information entered in the record RH.

This route information can be used in order to transmit MS service messages to the head. In fact, a join method according to the invention can include a step 123 to transmit an MS service message to the device acting as cluster head or head for a specific service S. Said step 123 forms part of a processing operation 120 performed in order to contribute to said service S. Step 123 is implemented after a prior step in order, for example, to collect from a sensor 15 a measurement regarding the temperature within a container, to which the device 10 implementing method P100 is affixed. Clearly, said step 123 is also conditional on the presence (step 122 in FIG. 3) of a record RH containing the IDHc value of an identifier of a device or node acting as cluster head (situation symbolized by link 122-*y* in FIG. 3). Depending on whether said record contains a direct route, i.e. on whether only one head identifier value is present in the record RH, or an indirect route, i.e. the said record also contains an identifier value of a relaying member, the MS message is directly transmitted to said head or said relaying member.

Moreover, such transmission 123 of an MS service message can also be triggered by the receipt 121 of an MS service message emanating from a member of the same cluster and addressed to device 10, which implements said join method P100 and acts as a relaying member. After receiving said service message emanating from a member of the same cluster, step 121 can then include a step to receive and decode said MS message, or even to record temporarily in the memory 12, the data contained in said decoded MS service message. The relay of said MS message can thus be expressed by a retransmission in non-real time.

We shall now examine a join method P100 according to the invention and comprising a processing operation 130 in order to use an MR cluster destruction message as mentioned above.

Said processing operation 130 of a join method P100 according to the invention comprises a first step 131 to receive an MR cluster destruction message generated and transmitted by a third-party communicating electronic device, for example device 10i, having previously had the capacity to act as cluster head. As previously examined with regard to steps 114 and 115, an MR cluster destruction message contains the IDR identifier of the device having transmitted the said MR cluster destruction message. The processing operation 130 also includes a step 132 to decode said cluster destruction message and deduce the value of the IDR identifier of the device that transmitted said cluster destruction message. The receipt of said MR message by a device acting as a member of the cluster affected by the destruction message, means a strict instruction to abandon the cluster, said member resuming a loose node status. For this, method P100 advantageously includes a step 133 to update the record RH containing the current IDHc value of the identifier of a device acting as cluster head, in order to delete said current value or replace it by a predetermined value reflecting an absence of identifier of the device acting as a cluster head. Clearly, the said update 133 of the record RH is only performed if (situation symbolized by the link 134-y with regard to FIG. 3) the value of the IDR identifier deduced from the MR cluster destruction message is identical to the current IDHc value written in said record RH. Method P100 thus includes a step 134, before step 133, in order to implement said comparison of values of identifiers IDR and IDHc.

Within the context of the operation of a multi-hop network, just like an MH enrollment message, an MR cluster destruction message can advantageously be relayed by a member becoming loose by implementing step 133, triggering the transmission of said MR' relayed message to other possible members of the cluster being destroyed.

Whatever the configuration of a cluster join method P100, said method being in accordance with the invention, a preferred method of adaptation of a communicating electronic device, such as the one described with regard to FIG. 2, involves logging or downloading in a program memory 14, a computer program P, containing a plurality of program instructions that, when they are executed or interpreted by the processing unit of said device, cause the implementation of said method P100.

The invention has been described through a preferred example of application with regard to monitoring containers of goods and solid, fluid or liquid merchandise, said containers cooperating respectively with communicating electronic devices, such as devices 10 and 10i according to FIG. 2, implementing a join method, such as method P100 illustrated in FIG. 3, said devices each comprising a sensor cooperating with a processing unit in order to measure and collect a parameter regarding the internal and/or external environments of said containers.

These devices could be used for any other application apart from that aimed at transmitting data collected via a long-distance connection. As a variation or in addition, they could also ensure one or more other services. For this, as we have stated above, the data memory 12 of each device may contain, not only one record RH dedicated to a specific service S, but a plurality of RHn records, forming a table, each record being dedicated to a particular service Sn. The MH, MH' enrollment, MS service and even MR, MR' cluster destruction messages would include, according to this variation, information enabling the specific Sn service affected by each of said messages to be identified.

Moreover, the invention thus concerns any system comprising a plurality of communicating electronic devices according to the invention. More particularly, the invention concerns any system for tracking containers in a storage area or on a transport platform, said system also comprising a remote entity to collect and use MC messages transmitted from one or more of said devices when they act as cluster heads. Such a system offers performance levels, as regards energy self-sufficiency, reliability and adaptability to operating conditions that are unequalled and without possible comparison in relation to those offered by known solutions such as, by way of example, the LEACH method. In fact, thanks to the invention, the operation of cluster heads, from their elections until performing the action or actions concerned by a specific service, is optimal, preventing any superfluous or inefficient communication within the network or to third-party entities.

The invention claimed is:

1. A method for joining a cluster comprising a plurality of communicating electronic devices, said method being implemented by a processor of one of said communicating electronic devices or of a communicating electronic device foreign to said cluster, said electronic device comprising, in addition to said processor, a data memory, a first communication interface ensuring a wireless proximity communication with any other electronic device located within communication range, said memory and said communication interface cooperating with said processor, the data memory containing the value of an identifier dedicated to the communicating electronic device and a record to contain the current value of an identifier of a communicating electronic device acting as a cluster head, said method comprising:

a step for receiving an enrollment message generated and transmitted by a third-party communicating electronic device, said enrollment message comprising the identifier of the device that transmitted said enrollment message and a datum expressing the capacity of said transmitting device to ensure a given service;

a step for decoding said enrollment message and deducing therefrom said identifier of said device that transmitted the enrollment message and the datum expressing said capacity;

a step for updating the record so that said record memorizes the value of the identifier of the device transmitting the decoded enrollment message and the value of the datum expressing the capacity of the transmitting device to ensure said service;

wherein:

the step for updating the record is not performed unless the datum expressing said capacity is greater than or equal to a minimum specific requirement threshold, said device implementing said method becoming a cluster member of which the device acting as a cluster head contains an identifier whose value is equal to the current identifier value memorized in said record.

2. The method according to claim 1, including an intermediate step after the step for decoding an enrollment message and before the step for updating the record containing the current value of the identifier of the device acting as cluster head, said intermediate step comprising:
reading in said record the current value of the identifier of the device acting as cluster head; and
comparing said current value with that of the identifier of the device that transmitted the decoded enrollment message,
and wherein, if said identifier values are separate, the step for updating the record is not performed unless the datum expressing the capacity of the device transmitting the enrollment message to ensure a service is greater than or equal to the value of the datum expressing the current capacity of the device acting as cluster head plus a specific constant.

3. The method according to claim 1, comprising a step after the step for updating the record, to encode and transmit, via the communication interface, a relayed enrollment message comprising the identifier of the device written in the record containing the current value of the identifier of the device acting as cluster head, the datum expressing the capacity of said device to ensure the service, and the identifier of the device implementing said join method and acting as cluster member, thereby relaying the enrollment message emanating from the device acting as cluster head.

4. The method according to claim 3, wherein the step to decode a relayed enrollment message involves deducing from said message the value of the identifier of a device acting as a cluster member and the value of the identifier of a device having relayed said enrollment message, and wherein the step for updating the record also comprises entering in said record said identifier of the cluster member device, which relayed the enrollment message, the paired identifiers of the cluster member devices and cluster head thus constituting route information.

5. The method according to claim 1, comprising a step to transmit a service message to the device acting as cluster head for the service in question.

6. The method according to claim 1, comprising:
a step to receive a cluster destruction message generated and transmitted by a third-party communicating electronic device having previously had the capacity to act as cluster head, said cluster destruction message containing the identifier of the device having transmitted said cluster destruction message;
a step to decode said cluster destruction message and deduce therefrom said identifier of said device that transmitted the cluster destruction message; and
a step for updating the record containing the current value of an identifier of a device acting as cluster head in order to delete said current value or replace it with a predetermined value expressing an absence of identifier of a device acting as cluster head, said device implementing said method becoming disjoined, said update of the record being performed only if the value of the identifier deduced from the cluster destruction message is identical to the current value entered in said record.

7. The method according to claim 1, comprising:
a step to assess the capacity of the device, implementing said method, to perform a specific service, said step comprising assessing one or more operating parameters of said device and producing the datum expressing the capacity of said device to ensure the specific service;
a step to compare the datum expressing said capacity to a minimum requirement operating threshold; and
a step to encode and transmit an enrollment message containing the identifier of said device as well as the datum expressing the capacity of said device to ensure the specific service to any communicating device located within communication range, said encode and transmit step only being implemented if the datum expressing said capacity is greater than or equal to said minimum requirement operating threshold.

8. The method according to claim 7, wherein the step to assess the capacity of the device implementing said method to perform a specific service is iterative, said method comprising a step, after transmitting an enrollment message, for decoding and transmitting a cluster destruction message, said message containing the identifier of said device, to any communicating device located within communication range, as soon as an occurrence of the step for assessing the capacity of the device to perform the specific service indicates that one parameter among the operating parameters of said device is below a required operational minimum, indicating insufficient capacity to ensure the service.

9. The method according to claim 7, wherein the device comprises an electrical energy source powering the processor, the data memory and the communication interface, and wherein one of said operating parameters describes the level of electrical energy available from the electrical energy source.

10. The method according to claim 7, wherein the device comprises second interface of long-distance communication cooperating with the processor, the service involving transmitting data to a remote entity via said long-distance communication interface, and wherein one of said operating parameters describes the transmission power of a signal by the long-distance communication interface.

11. A non-transitory computer-readable medium having stored thereon a program comprising a plurality of program instructions that,
when loaded in a program memory of an electronic device comprising a processor, a first communication interface ensuring a wireless proximity communication with any other electronic device located within communication range, a data memory recording the value of an identifier dedicated to the device and a record for containing the current value of an identifier of a device acting as a cluster head, said memories and communication interface cooperating with said processor; and
executed or interpreted by said processor,
cause the implementation of the method according to claim 1.

12. The non-transitory computer-readable medium according to claim 11, wherein the device implementing said method comprises an electrical energy source powering the processor, the data memory, the program memory and the first communication interface, and wherein the instructions, when they are executed or interpreted by the processing unit of the device, cause the implementation of the method to include:
a step to assess the capacity of the device, implementing said method, to perform a specific service, said step comprising assessing one or more operating parameters of said device and producing the datum expressing the capacity of said device to ensure the specific service,
wherein one of the operating parameters describes the level of electrical energy available from the electrical energy source.

13. Computer program according to claim 11, wherein the device implementing said method comprises a second long-distance communication interface cooperating with the processor, and wherein the instructions, when they are executed or interpreted by the processing unit of the device, cause the implementation of the method to include:
- a step to assess the capacity of the device, implementing said method, to perform a specific service, said step comprising assessing one or more operating parameters of said device and producing the datum expressing the capacity of said device to ensure the specific service,
- wherein one of the operating parameters describes the transmission power of a signal by the long-distance communication interface.

14. An electronic device comprising a processor, a data memory, a program memory, a first communication interface ensuring a wireless proximity communication with any other electronic device located within communication range, said memories and communication interface cooperating with said processor, the data memory containing the value of an identifier dedicated to the device and a record to contain the current value of an identifier of a device acting as a cluster head, wherein the program memory contains the program instructions according to claim 11.

15. An electronic device comprising a processor, a data memory, a program memory, a first communication interface ensuring a wireless proximity communication with any other electronic device located within communication range, and an electrical energy source powering the processor, said memories and communication interface cooperating with said processor, the data memory containing the value of an identifier dedicated to the device and a record to contain the current value of an identifier of a device acting as a cluster head, wherein the program memory contains the program instructions according to claim 12.

16. An electronic device comprising a processor, a data memory, a program memory, a first communication interface ensuring a wireless proximity communication with any other electronic device located within communication range, and a second long-distance communication interface cooperating with the processor, said memories and communication interface cooperating with said processor, the data memory containing the value of an identifier dedicated to the device and a record to contain the current value of an identifier of a device acting as a cluster head, wherein the program memory contains the program instructions according to claim 13.

17. A system comprising a plurality of communicating electronic devices according to claim 14.

18. The system according to claim 17 comprising a plurality of containers of goods and solid, fluid or liquid merchandise, said containers cooperating respectively with the communicating electronic devices, each electronic device comprising a sensor cooperating with the processor to measure and collect a parameter relating to the internal and/or external environments of said containers.

* * * * *